(12) United States Patent
Wu et al.

(10) Patent No.: US 7,625,459 B2
(45) Date of Patent: Dec. 1, 2009

(54) METHOD FOR MANUFACTURING LIQUID-TRAPPING BAG FOR USE IN VACUUM PACKAGING

(75) Inventors: Hongyu Wu, San Jose, CA (US);
Charles Wade Albritton, Hercules, CA (US); David Brakes, Hong Kong (CN)

(73) Assignee: Sunbeam Products, Inc., Boca Raton, FL (US)

( * ) Notice: Subject to any disclaimer, the term of this patent is extended or adjusted under 35 U.S.C. 154(b) by 580 days.

(21) Appl. No.: 11/479,510

(22) Filed: Jun. 30, 2006

(65) Prior Publication Data

US 2006/0243386 A1    Nov. 2, 2006

Related U.S. Application Data

(63) Continuation of application No. 10/794,349, filed on Mar. 4, 2004, now abandoned.

(60) Provisional application No. 60/452,138, filed on Mar. 5, 2003.

(51) Int. Cl.
*B29C 47/06* (2006.01)
*B65B 31/04* (2006.01)

(52) U.S. Cl. .................. 156/244.24; 156/244.25; 53/408; 426/415

(58) Field of Classification Search .................. None
See application file for complete search history.

(56) References Cited

U.S. PATENT DOCUMENTS

| 274,447 A | 3/1883 | Kennish |
|---|---|---|
| 1,938,593 A | 12/1933 | Jarrier |
| 2,085,766 A | 7/1937 | Potdevin et al. |
| 2,105,376 A | 1/1938 | Scott |
| 2,247,566 A * | 7/1941 | Walton .................. 137/254 |
| 2,265,075 A | 12/1941 | Knuetter |
| 2,387,812 A | 10/1945 | Sonnebom et al. |
| 2,429,482 A | 10/1947 | Munters |
| 2,480,316 A | 8/1949 | Blair et al. |
| 2,607,712 A | 8/1952 | Sturken |
| 2,609,314 A | 9/1952 | Engel et al. |
| 2,633,442 A | 3/1953 | Caldwell |
| 2,642,372 A | 6/1953 | Chittick |

(Continued)

FOREIGN PATENT DOCUMENTS

EP    0 723 915    7/1996

(Continued)

*Primary Examiner*—John L. Goff
*Assistant Examiner*—Barbara J. Musser
(74) *Attorney, Agent, or Firm*—Lawrence J. Shurupoff

(57) ABSTRACT

A method for manufacturing a bag for use in vacuum packaging comprises forming a first panel having a plurality of baffles for evacuating air and/or other gases from inside the bag using a suction source, while preventing liquids from being drawn into the suction source, and a second panel. Each panel comprises a gas-impermeable base layer and a heat-sealable inner layer molded from melt-extruded resin. The first panel is overlapped with the second panel, and three of four edges of the panels are heated such that the inner layers bond at the heated edges. This description is not intended to be a complete description of, or limit the scope of, the invention. Other features, aspects, and objects of the invention can be obtained from a review of the specification, the figures, and the claims.

17 Claims, 6 Drawing Sheets

U.S. PATENT DOCUMENTS

| | | | |
|---|---|---|---|
| 2,670,501 A | 3/1954 | Michiels | |
| 2,690,206 A | 9/1954 | Mueller | |
| 2,695,741 A | 11/1954 | Haley | |
| 2,759,866 A | 8/1956 | Seymour | |
| 2,772,712 A | 12/1956 | Post | |
| 2,776,452 A | 1/1957 | Chavannes | |
| 2,778,171 A | 1/1957 | Taunton | |
| 2,778,173 A | 1/1957 | Taunton | |
| 2,789,609 A | 4/1957 | Post | |
| 2,821,338 A | 1/1958 | Metzger | |
| 2,856,323 A | 10/1958 | Gordon | |
| 2,858,247 A | 10/1958 | De Swart | |
| 2,913,030 A | 11/1959 | Fisher | |
| 2,916,411 A | 12/1959 | Villoresi | |
| 2,960,144 A | 11/1960 | Graf | |
| 3,026,231 A | 3/1962 | Chavannes | |
| 3,060,985 A | 10/1962 | Vance et al. | |
| 3,077,262 A | 2/1963 | Gaste | |
| 3,077,428 A | 2/1963 | Heuser et al. | |
| 3,098,563 A | 7/1963 | Skees | |
| 3,102,676 A | 9/1963 | Danelli et al. | |
| 3,113,715 A | 12/1963 | Pangrac | |
| 3,135,411 A | 6/1964 | Osborne | |
| 3,141,221 A | 7/1964 | Faulls, Jr. | |
| 3,142,599 A | 7/1964 | Chavannes | |
| 3,149,772 A | 9/1964 | Olsson | |
| 3,160,323 A | 12/1964 | Weisberg | |
| 3,224,574 A | 12/1965 | McConnell et al. | |
| 3,237,844 A | 3/1966 | Hughes | |
| 3,251,463 A | 5/1966 | Bodet | |
| 3,325,084 A | 6/1967 | Ausnit | |
| 3,334,805 A | 8/1967 | Halbach | |
| 3,381,887 A | 5/1968 | Lowry | |
| 3,411,698 A | 11/1968 | Reynolds | |
| 3,423,231 A | 1/1969 | Lutzmann | |
| 3,516,217 A | 6/1970 | Gildersleeve | |
| 3,533,548 A | 10/1970 | Taterka | |
| 3,565,147 A | 2/1971 | Ausnit | |
| 3,575,781 A | 4/1971 | Pezely | |
| 3,595,467 A | 7/1971 | Goglio | |
| 3,595,722 A | 7/1971 | Dawbarn | |
| 3,595,740 A | 7/1971 | Gerow | 161/254 |
| 3,600,267 A | 8/1971 | McFedries, Jr. | |
| 3,661,677 A | 5/1972 | Wang | 156/315 |
| 3,785,111 A | 1/1974 | Pike | 53/14 |
| 3,799,427 A | 3/1974 | Gogllo | |
| 3,809,217 A | 5/1974 | Harrison | 206/84 |
| 3,833,166 A | 9/1974 | Murray | |
| 3,895,153 A | 7/1975 | Johnston et al. | |
| 3,908,070 A | 9/1975 | Marzolf | 428/474 |
| 3,937,395 A | 2/1976 | Lawes | 229/62.5 |
| 3,958,391 A | 5/1976 | Kujubu | 53/22 |
| 3,958,693 A | 5/1976 | Greene | |
| 3,980,226 A | 9/1976 | Franz | |
| 3,998,499 A | 12/1976 | Chiarotto | |
| 4,018,253 A | 4/1977 | Kaufman | |
| 4,066,167 A | 1/1978 | Hanna et al. | |
| 4,098,404 A | 7/1978 | Markert | |
| 4,104,404 A | 8/1978 | Bieler et al. | 428/35 |
| 4,105,491 A | 8/1978 | Haase et al. | |
| 4,155,453 A | 5/1979 | Ono | |
| 4,164,111 A | 8/1979 | Di Bernardo | |
| 4,179,862 A | 12/1979 | Landolt | |
| 4,186,786 A | 2/1980 | Kirkpatrick | |
| 4,212,337 A | 7/1980 | Kamp | |
| 4,215,725 A | 8/1980 | Callet et al. | |
| 4,295,566 A | 10/1981 | Vincek | 206/457 |
| 4,310,118 A | 1/1982 | Kisida et al. | |
| 4,340,558 A | 7/1982 | Hendrickson | |
| 4,370,187 A | 1/1983 | Katagiri et al. | 156/244.23 |
| 4,372,921 A | 2/1983 | Sanderson et al. | |
| 4,449,243 A | 5/1984 | Platel | 383/103 |
| 4,486,923 A | 12/1984 | Briggs | |
| 4,532,652 A | 7/1985 | Herrington | |
| 4,551,379 A | 11/1985 | Kerr | 428/200 |
| 4,569,712 A | 2/1986 | Shibano et al. | 156/244.14 |
| 4,575,990 A | 3/1986 | Von Bismarck | |
| 4,576,283 A | 3/1986 | Fafournoux | 206/524.8 |
| 4,576,285 A | 3/1986 | Goglio | |
| 4,579,756 A | 4/1986 | Edgel | 428/34 |
| 4,583,347 A | 4/1986 | Nielsen | |
| 4,658,434 A | 4/1987 | Murray | 383/66 |
| 4,669,124 A | 5/1987 | Kimura | |
| 4,672,684 A | 6/1987 | Barnes et al. | 383/45 |
| 4,683,702 A | 8/1987 | Vis | 53/433 |
| 4,705,174 A | 11/1987 | Goglio | |
| 4,712,574 A | 12/1987 | Perrott | |
| 4,756,422 A | 7/1988 | Kristen | |
| 4,756,629 A | 7/1988 | Tilman et al. | |
| 4,778,282 A | 10/1988 | Borchardt et al. | |
| 4,786,285 A | 11/1988 | Jambor | |
| 4,812,056 A | 3/1989 | Zieke | |
| 4,834,554 A | 5/1989 | Stetler, Jr. et al. | 383/100 |
| 4,841,603 A | 6/1989 | Ragni | |
| 4,871,264 A | 10/1989 | Robbins, III et al. | |
| 4,877,334 A | 10/1989 | Cope | 383/3 |
| 4,887,912 A | 12/1989 | Stumpf | |
| 4,890,637 A | 1/1990 | Lamparter | |
| 4,892,414 A | 1/1990 | Ausnit | |
| 4,903,718 A | 2/1990 | Sullivan | |
| 4,906,108 A | 3/1990 | Herrington et al. | 383/71 |
| 4,913,561 A | 4/1990 | Beer | 383/94 |
| 4,917,506 A | 4/1990 | Scheibner | |
| 4,917,844 A | 4/1990 | Komai et al. | 264/85 |
| 4,941,310 A * | 7/1990 | Kristen | 53/512 |
| 4,953,708 A | 9/1990 | Beer et al. | 206/632 |
| 4,973,171 A | 11/1990 | Bullard | 383/70 |
| 5,006,056 A | 4/1991 | Mainstone et al. | 425/186 |
| 5,040,904 A | 8/1991 | Cornwell | 583/71 |
| 5,048,269 A | 9/1991 | Denl | |
| D320,549 S | 10/1991 | McKellar et al. | D9/311 |
| 5,053,091 A | 10/1991 | Giljam et al. | |
| 5,063,639 A | 11/1991 | Boeckmann et al. | |
| 5,080,155 A | 1/1992 | Crozier | |
| 5,097,956 A | 3/1992 | Davis | 206/524.8 |
| 5,098,497 A | 3/1992 | Brinley | 156/219 |
| 5,106,688 A | 4/1992 | Bradfute et al. | |
| 5,111,838 A | 5/1992 | Langston | |
| 5,116,444 A | 5/1992 | Fox | |
| 5,121,590 A | 6/1992 | Scanlan | |
| 5,142,970 A | 9/1992 | ErkenBrack | |
| 5,203,458 A | 4/1993 | Cornwell | 206/524.8 |
| 5,209,264 A | 5/1993 | Koyanagi | |
| D338,399 S | 8/1993 | Conte, Jr. | |
| 5,240,112 A | 8/1993 | Newburger | 206/524.8 |
| 5,242,516 A | 9/1993 | Custer et al. | |
| 5,246,114 A | 9/1993 | Underwood | |
| 5,252,379 A | 10/1993 | Kuribayashi et al. | 428/141 |
| 5,332,095 A | 7/1994 | Wu | |
| 5,333,736 A | 8/1994 | Kawamura | |
| 5,339,959 A | 8/1994 | Cornwell | |
| 5,352,323 A | 10/1994 | Chi | |
| 5,362,351 A | 11/1994 | Karszes | 156/243 |
| 5,368,394 A | 11/1994 | Scott et al. | |
| 5,371,925 A | 12/1994 | Sawatsky | |
| 5,373,965 A | 12/1994 | Halm et al. | |
| 5,397,182 A | 3/1995 | Gaible et al. | |
| 5,402,906 A | 4/1995 | Brown et al. | |
| RE34,929 E | 5/1995 | Kristen | 206/524.8 |
| D360,578 S | 7/1995 | Dees | D9/305 |
| 5,445,275 A | 8/1995 | Curley et al. | 206/525 |
| 5,450,963 A | 9/1995 | Carson | |
| 5,480,030 A | 1/1996 | Sweeney et al. | |
| 5,526,843 A | 6/1996 | Wolf et al. | |

| | | | | |
|---|---|---|---|---|
| 5,540,500 | A | 7/1996 | Tanaka | 383/43 |
| 5,542,902 | A | 8/1996 | Richison et al. | 493/195 |
| 5,544,752 | A | 8/1996 | Cox | |
| 5,549,944 | A | 8/1996 | Abate | |
| 5,551,213 | A | 9/1996 | Koelsch et al. | |
| 5,554,423 | A | 9/1996 | Abate | 428/35.2 |
| 5,584,409 | A | 12/1996 | Chemberlen | |
| 5,592,697 | A | 1/1997 | Young | |
| 5,620,098 | A | 4/1997 | Boos et al. | |
| 5,638,664 | A | 6/1997 | Levsen et al. | |
| 5,655,273 | A | 8/1997 | Tomic et al. | |
| 5,656,209 | A | 8/1997 | Benz et al. | |
| 5,665,456 | A | 9/1997 | Kannankeril et al. | |
| 5,689,866 | A | 11/1997 | Kasai et al. | |
| 5,699,936 | A | 12/1997 | Sakamoto | |
| 5,701,996 | A | 12/1997 | Goto et al. | 206/287 |
| 5,709,467 | A | 1/1998 | Galliano, II | |
| 5,735,395 | A | 4/1998 | Lo | |
| 5,749,493 | A | 5/1998 | Boone et al. | |
| 5,765,608 | A | 6/1998 | Kristen | |
| 5,772,034 | A | 6/1998 | Lin | |
| 5,812,188 | A | 9/1998 | Adair | |
| 5,829,884 | A | 11/1998 | Yeager | 383/61 |
| 5,839,582 | A | 11/1998 | Strong et al. | 206/524.8 |
| 5,873,217 | A | 2/1999 | Smith | |
| 5,874,155 | A | 2/1999 | Gehrke et al. | |
| 5,881,881 | A | 3/1999 | Carrington | |
| 5,893,822 | A | 4/1999 | Deni et al. | |
| 5,898,113 | A | 4/1999 | Vercere | 73/864.62 |
| 5,908,245 | A | 6/1999 | Bost et al. | |
| 5,915,596 | A | 6/1999 | Credle, Jr. | |
| 5,927,336 | A | 7/1999 | Tanaka et al. | |
| 5,928,762 | A | 7/1999 | Aizawa et al. | 428/156 |
| D413,258 | S | 8/1999 | Voller | |
| 5,931,189 | A | 8/1999 | Sweeney et al. | |
| 5,941,421 | A | 8/1999 | Overman et al. | |
| 5,941,643 | A | 8/1999 | Linkiewicz | |
| 5,954,196 | A | 9/1999 | Lin | |
| 5,957,831 | A | 9/1999 | Adair | |
| 5,971,613 | A | 10/1999 | Bell | |
| 5,996,800 | A | 12/1999 | Pratt | |
| 6,021,624 | A | 2/2000 | Richison et al. | 53/410 |
| 6,023,914 | A | 2/2000 | Richison et al. | 53/410 |
| 6,029,810 | A | 2/2000 | Chen | |
| 6,030,652 | A | 2/2000 | Hanus | |
| 6,035,769 | A | 3/2000 | Nomura et al. | |
| 6,039,182 | A | 3/2000 | Light | |
| 6,045,006 | A | 4/2000 | Fraxier et al. | |
| 6,045,264 | A | 4/2000 | Miniea | |
| 6,053,606 | A | 4/2000 | Yamaguchi et al. | |
| D425,786 | S | 5/2000 | Voller | |
| 6,059,457 | A | 5/2000 | Sprehe et al. | |
| 6,070,728 | A | 6/2000 | Overby et al. | |
| 6,074,677 | A | 6/2000 | Croft | 426/124 |
| 6,076,967 | A | 6/2000 | Beaudette | |
| 6,077,373 | A | 6/2000 | Fletcher et al. | |
| 6,089,271 | A | 7/2000 | Tani | |
| 6,105,821 | A | 8/2000 | Christine et al. | |
| 6,116,781 | A | 9/2000 | Skeens | 383/100 |
| 6,161,716 | A | 12/2000 | Oberhofer et al. | |
| 6,164,826 | A | 12/2000 | Petkovsek | |
| 6,202,849 | B1 | 3/2001 | Graham | |
| 6,220,702 | B1 | 4/2001 | Nakamura et al. | |
| 6,224,528 | B1 | 5/2001 | Bell | |
| 6,227,706 | B1 | 5/2001 | Tran | |
| 6,231,234 | B1 | 5/2001 | Gebhardt | |
| 6,231,236 | B1 | 5/2001 | Tilman | |
| 6,274,181 | B1 | 8/2001 | Richison et al. | 426/118 |
| D451,542 | S | 12/2001 | Ishizawa et al. | |
| 6,357,915 | B2 | 3/2002 | Anderson | 383/100 |
| 6,402,873 | B1 | 6/2002 | Fujii et al. | 156/244.11 |
| 6,408,872 | B1 | 6/2002 | Skeens et al. | |
| 6,423,356 | B2 | 7/2002 | Richison et al. | 426/118 |
| 6,520,071 | B1 | 2/2003 | Lanza | |
| 2001/0023572 | A1 | 9/2001 | Savage et al. | |
| 2004/0000501 | A1 | 1/2004 | Shah et al. | |
| 2004/0000502 | A1 | 1/2004 | Shah et al. | |
| 2004/0000503 | A1 | 1/2004 | Shah et al. | |
| 2004/0007494 | A1 | 1/2004 | Popeil et al.. | |

FOREIGN PATENT DOCUMENTS

| | | | |
|---|---|---|---|
| EP | 0 836 927 | | 4/1998 |
| EP | 1 053 945 | | 11/2000 |
| JP | 55-90364 | | 7/1980 |
| JP | 62-192779 | | 8/1987 |
| JP | 7-299865 | | 11/1995 |
| JP | 8-90740 | | 4/1996 |
| JP | 9-131846 | | 5/1997 |
| JP | 9-252919 | | 9/1997 |
| JP | 10034760 | A | 2/1998 |
| JP | 10-138377 | | 5/1998 |
| JP | 10-180846 | | 7/1998 |
| JP | 11-77903 | | 3/1999 |
| JP | 11-151142 | | 6/1999 |
| JP | 11-254631 | | 9/1999 |
| JP | 2000-15767 | | 1/2000 |
| JP | 2000-218746 | | 8/2000 |
| KR | 20-0248033 | | 5/1995 |
| WO | WO 00/71422 | | 11/2000 |
| WO | WO 02/28577 | A2 | 4/2002 |
| WO | WO 02/066227 | A1 | 8/2002 |
| WO | WO 02/074522 | A1 | 9/2002 |
| WO | WO 2004/078609 | | 9/2004 |

* cited by examiner

METHOD FOR MANUFACTURING LIQUID-TRAPPING BAG FOR USE IN VACUUM PACKAGING

PRIORITY CLAIM

This application is a continuation of U.S. application Ser. No. 10/794,349 filed on Mar. 4, 2004 now abandoned which claims priority to U.S. Provisional Application 60/452,138 filed on March 5, 2003. The entire disclosure of each of the aforementioned patent applications are incorporated herein by reference.

CROSS-REFERENCE TO RELATED PATENT APPLICATIONS

This U.S. Patent Application incorporates by reference all of the following co-pending applications:

U.S. Provisional Patent Application No. 60/452,168, entitled "LIQUID-TRAPPING BAG FOR USE IN VACUUM PACKAGING," by Henry Wu, et al., filed Mar. 5, 2003;

U.S. Provisional Patent Application No. 60/452,172, entitled "SEALABLE BAG HAVING AN INTEGRATED TRAY FOR USE IN VACUUM PACKAGING," by Henry Wu, et al., filed Mar. 5, 2003;

U.S. Provisional Patent Application No. 60/452,171, entitled "METHOD FOR MANUFACTURING A SEALABLE BAG HAVING AN INTEGRATED TRAY FOR USE IN VACUUM PACKAGING," by Henry Wu, et al., filed Mar. 5, 2003;

U.S. Provisional Patent Application No. 60/451,954, entitled "SEALABLE BAG HAVING AN INDICIA FOR USE IN VACUUM PACKAGING," by Henry Wu, et al., filed Mar. 5, 2003;

U.S. Provisional Patent Application No. 60/451,948, entitled "METHOD FOR MANUFACTURING A SEALABLE BAG HAVING AN INDICIA FOR USE IN VACUUM PACKAGING," by Henry Wu, et al., filed Mar. 5, 2003;

U.S. Provisional Patent Application No. 60/452,142, entitled "SEALABLE BAG HAVING AN INTEGRATED ZIPPER FOR USE IN VACUUM PACKAGING," by Henry Wu, et al., filed Mar. 5, 2003;

U.S. Provisional Patent Application No. 60/452,021, entitled "METHOD FOR MANUFACTURING A SEALABLE BAG HAVING AN INTEGRATED ZIPPER FOR USE IN VACUUM PACKAGING," by Henry Wu, et al., filed Mar. 5, 2003;

U.S. Provisional Patent Application No. 60/451,955, entitled "SEALABLE BAG HAVING AN INTEGRATED VALVE STRUCTURE FOR USE IN VACUUM PACKAGING," by Henry Wu, et al., filed Mar. 5, 2003;

U.S. Provisional Patent Application No. 60/451,956, entitled "METHOD FOR MANUFACTURING A SEALABLE BAG HAVING AN INTEGRATED VALVE STRUCTURE FOR USE IN VACUUM PACKAGING," by Henry Wu, et al., filed Mar. 5, 2003;

U.S. Provisional Patent Application No. 60/452,157, entitled "SEALABLE BAG HAVING AN INTEGRATED TIMER/SENSOR FOR USE IN VACUUM PACKAGING," by Henry Wu, et al., filed Mar. 5, 2003;

U.S. Provisional Patent Application No. 60/452,139, entitled "METHOD FOR MANUFACTURING A SEALABLE BAG HAVING AN INTEGRATED TIMER/SENSOR FOR USE IN VACUUM PACKAGING," by Henry Wu, et al., filed Mar. 5, 2003;

U.S. patent application Ser. No. 10/169,485, entitled "METHOD FOR PREPARING AIR CHANNEL EQUIPPED FILM FOR USE IN VACUUM PACKAGE", filed Jun. 26, 2002;

U.S. patent application Ser. No. 10/795,149, entitled "LIQUID-TRAPPING BAG FOR USE IN VACUUM PACKAGING," filed concurrently;

U.S. patent application Ser. No. 10/794,951, entitled "SEALABLE BAG HAVING AN INTEGRATED TRAY FOR USE IN VACUUM PACKAGING," filed concurrently;

U.S. patent application Ser. No. 10/794,369, entitled "METHOD FOR MANUFACTURING A SEALABLE BAG HAVING AN INTEGRATED TRAY FOR USE IN VACUUM PACKAGING," filed concurrently.

U.S. patent application Ser. No. 10/794,488, entitled "SEALABLE BAG HAVING AN INDICIA FOR USE IN VACUUM PACKAGING," filed concurrently;

U.S. patent application Ser. No. 10/794,351, entitled "METHOD FOR MANUFACTURING A SEALABLE BAG HAVING AN INDICIA FOR USE IN VACUUM PACKAGING," filed concurrently;

U.S. patent application Ser. No. 10/795,048, entitled, "SEALABLE BAG HAVING AN INTEGRATED ZIPPER FOR USE IN VACUUM PACKAGING," filed concurrently;

U.S. patent application Ser. No. 10/794,487, entitled, "METHOD FOR MANUFACTURING A SEALABLE BAG HAVING AN INTEGRATED ZIPPER FOR USE IN VACUUM PACKAGING," filed concurrently;

U.S. patent application Ser. No. 10/794,354, entitled, "SEALABLE BAG HAVING AN INTEGRATED VALVE STRUCTURE FOR USE IN VACUUM PACKAGING," filed concurrently;

U.S. patent application Ser. No. 10/794,952, entitled, "METHOD FOR MANUFACTURING A SEALABLE BAG HAVING AN INTEGRATED VALVE STRUCTURE FOR USE IN VACUUM PACKAGING," filed concurrently;

U.S. patent application Ser. No. 10/794,368, entitled, "SEALABLE BAG HAVING AN INTEGRATED TIMER/SENSOR FOR USE IN VACUUM PACKAGING," filed concurrently; and U.S. patent application Ser. No. 10/794,373, entitled, "METHOD FOR MANUFACTURING A SEALABLE BAG HAVING AN INTEGRATED TIMER/SENSOR FOR USE IN VACUUM PACKAGING," filed concurrently.

FIELD OF THE INVENTION

The present invention relates to bags for use in vacuum packaging and methods and devices for manufacturing bags for use in vacuum packaging.

BACKGROUND

Methods and devices for preserving perishable foods such as fish and meats, processed foods, prepared meals, and leftovers, and non-perishable items are widely known, and widely varied. Foods are perishable because organisms such as bacteria, fungus and mold grow over time after a food container is opened and the food is left exposed to the atmosphere. Most methods and devices preserve food by protecting food from organism-filled air. A common method and device includes placing food into a gas-impermeable plastic bag, evacuating the air from the bag using suction from a vacuum pump or other suction source, and tightly sealing the bag.

A bag for use in vacuum packaging can consist of a first panel and second panel, each panel consisting of a single layer of heat-sealable, plastic-based film (for example, polyethylene). The panels are sealed together along a substantial portion of the periphery of the panels by heat-sealing techniques so as to form an envelope. Perishable products, such as spoilable food, or other products are packed into the envelope via the unsealed portion through which air is subsequently evacuated. After perishable products are packed into the bag and air is evacuated from the inside of the bag, the unsealed portion is heated and pressed such that the panels adhere to each other, sealing the bag.

U.S. Pat. No. 2,778,173, incorporated herein by reference, discloses a method for improving the evacuation of air from the bag by forming channels in at least one of the panels with the aid of embossing techniques. Air escapes from the bag along the channels during evacuation. The embossing forms a pattern of protuberances on at least one of the panels. The protuberances can be discrete pyramids, hemispheres, etc., and are formed by pressing a panel using heated female and male dies. The first panel is overlaid on the second panel such that the protuberances from one panel face the opposite panel. The contacting peripheral edges of the panels are sealed to each other to form an envelope having an inlet at an unsealed portion of the periphery. The perishable or other products are packed into the envelope through the inlet, and the inlet is sealed. Thereafter, an opening is pierced in a part of the panel material that communicates with the channels, air is removed from the interior of the envelope through the channels and opening, and the opening is sealed. This type of bag requires two additional sealing steps after the perishable or other product is packed into the envelope. One further problem is that embossing creates impressions on the plastic such that indentations are formed on the opposite side of the panel To avoid additional sealing steps, a vacuum bag is formed having a first panel and a second panel consisting of laminated films. Each panel comprises a heat-sealable inner layer, a gas-impermeable outer layer, and optionally, one or more intermediate layers. Such a bag is described in U.S. Pat. No. Re. 34,929, incorporated herein by reference. At least one film from at least one panel is embossed using an embossing mold to form protuberances and charnels defined by the space between protuberances, so that air is readily evacuated from the vacuum bag.

U.S. Pat. No. 5,554,423, incorporated herein by reference, discloses still another bag usable in vacuum packaging. The bag consists of a first and second panel, each panel consisting of a gas-impermeable outer layer and a heat-sealable inner layer. A plurality of heat-sealable strand elements are heat bonded at regular intervals to the inner layer of either the first panel or the second panel. The spaces between strand elements act as channels for the evacuation of air. The strand elements are extruded from an extrusion head and heat bonded to the heat-sealable layer by use of pressure rolls. Separate equipment is required for producing strand elements, and a procedure of heat bonding a plurality of strand elements at regular intervals to the heat-sealable inner layer is complicated. Also, various shapes of pattern are hard to form using this process.

BRIEF DESCRIPTION OF THE FIGURES

Further details of embodiments of the present invention are explained with the help of the attached drawings in which.

DETAILED DESCRIPTION

Figure 1A:
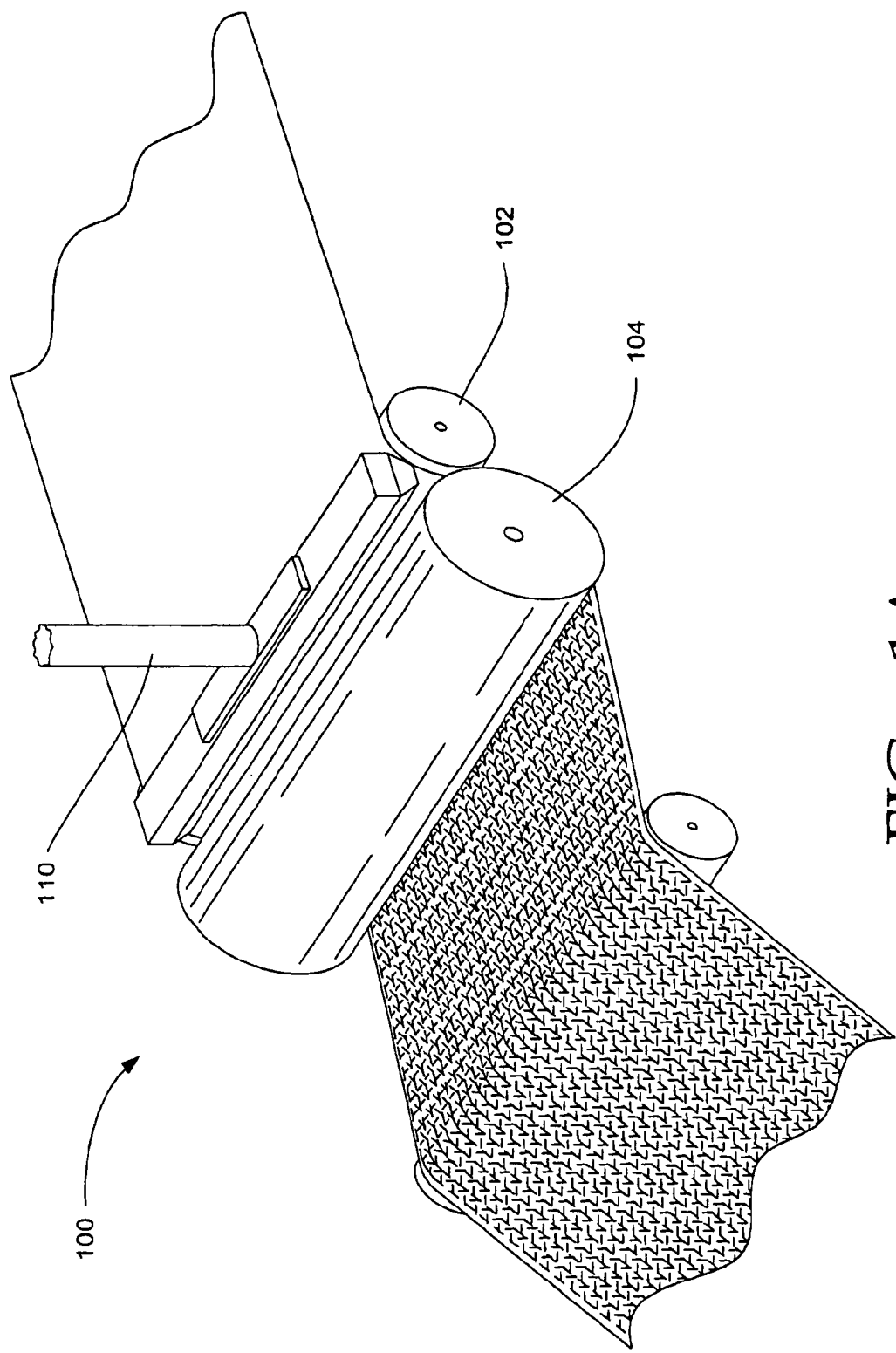
FIG. 1A is a perspective view of a method for manufacturing a vacuum bag in accordance with one embodiment of the present invention.
Figure 1B:
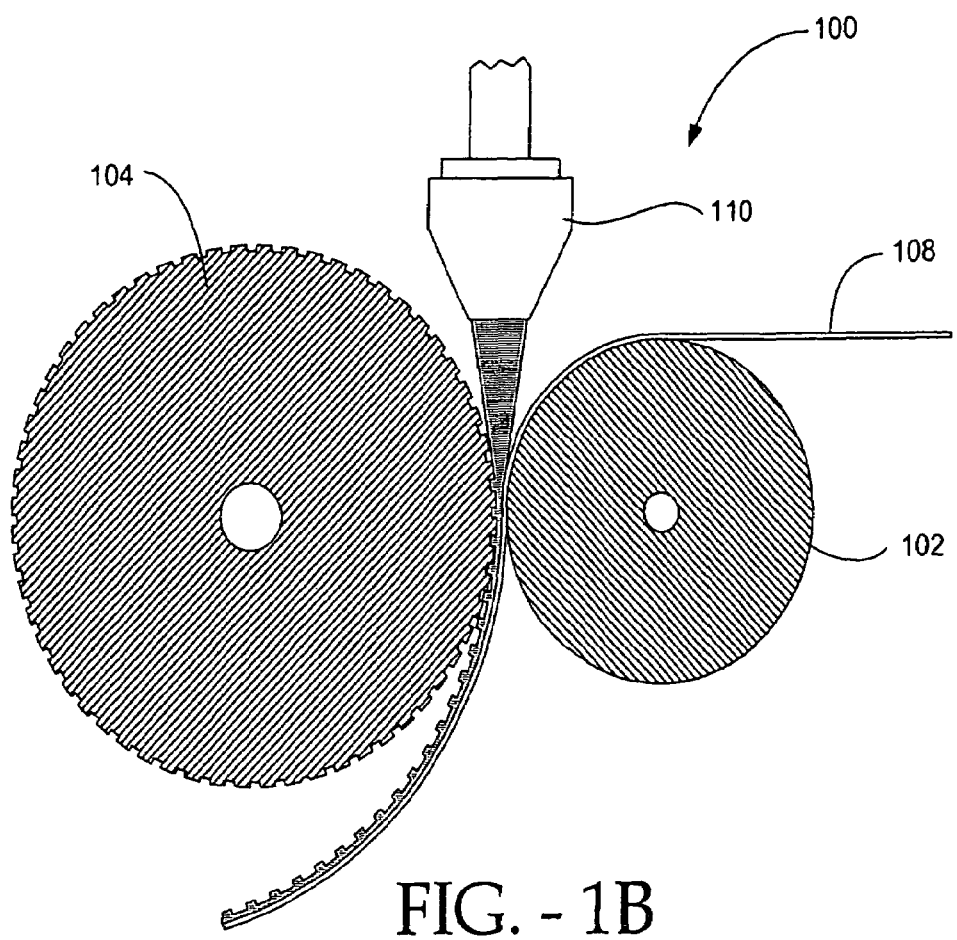
FIG. 1B is a side view of the method shown in FIG. 1A illustrating the embossing method used in an embodiment of the present invention.
Figure 1C:
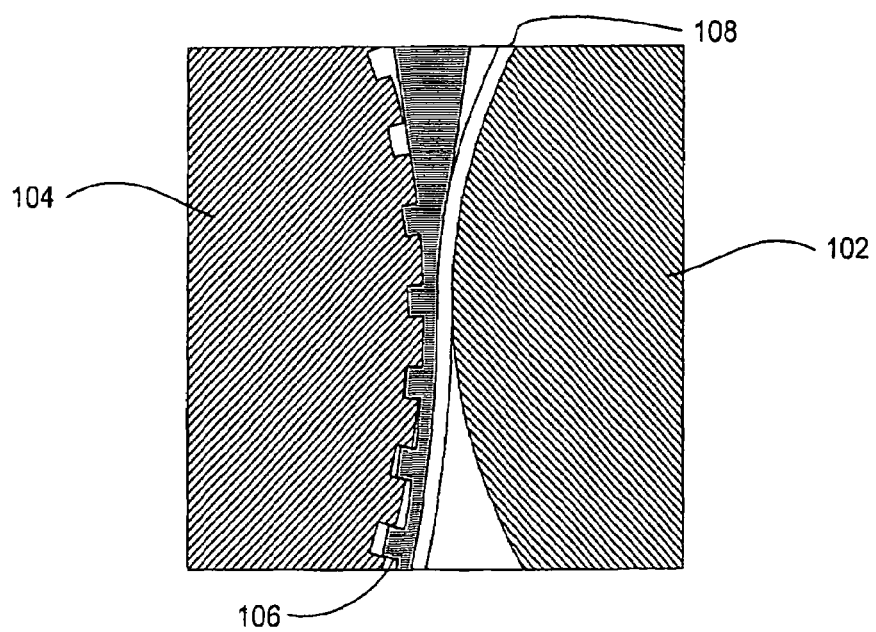
FIG. 1C is a close-up view of a portion of FIG. 1B.

FIGS. 1A-1C illustrate one embodiment of a method for manufacturing a vacuum bag in accordance with the present invention. The vacuum bag comprises a first panel and a second panel, wherein each panel comprises a gas-impermeable base layer 108 and a heat-sealable inner layer 106 with at least one panel having liquid flow obstructing protuberances and/or channels. A laminating roll 102 and a cooling roll 104 are arranged so that melt-extruded resin can be introduced between the rolls and cooled to form the heat-sealable inner layer 106 and to laminate the formed inner layer 106 to the gas-impermeable base layer 108. As illustrated in FIG. 1C, a gap between the laminating roll 102 and the cooling roll 104 can be controlled according to specifications (for example, thickness) of a panel for use in vacuum packaging. The temperature of the cooling roll 104 is maintained in a range such that the melt-extruded resin can be sufficiently cooled to form a desired pattern. For example, a temperature range of about $-15°$ C. to about $-10°$ C. can be sufficient to properly form the desired pattern. The temperature range of the cooling roll 104 can vary according to the composition of the resin, the composition of the gas-impermeable base layer 108, environmental conditions, etc. and can require calibration. Also, the cooling roll 104 can be sized to have a larger diameter than the laminating roll 102, thereby bringing the melt-extruded resin into contact with more cooled surface area. For example, the diameter of the cooling roll 104 can be about one-and-a-half to about three times as large (or more) as that of the laminating roll 102.

The heat-sealable inner layer 106 typically comprises a thermoplastic resin. For example, the resin can be comprised of polyethylene (PE) suitable for preserving foods and harmless to a human body. A vacuum bag can be manufactured by overlapping two panels such that the heat-sealable inner layers 106 of the two panels are brought into contact and heat is applied to a portion of the periphery of the panels to form an envelope. The thermoplastic resin can be chosen so that the two panels strongly bond to each other when sufficient heat is applied.

The gas-impermeable base layer 108 is fed to the gap between the cooling roll 104 and the laminating roll 102 by a feeding means (not shown). The gas-impermeable base layer can be comprised of polyester, polyamide, ethylene vinyl alcohol (EVOH), nylon, or other material having similar properties, that is capable of being heated and capable of being used in this manufacturing process. The gas-impermeable base layer 108 can consist of one layer, or two or more layers. When employing a multilayer-structured base layer, it should be understood that a total thickness thereof is also adjusted within the allowable range for the total gas-impermeable base layer 108.

An extruder 110 is positioned in such a way that the melt-extruded resin is layered on the gas-impermeable base layer 108 by feeding the melt-extruded resin to a nip between the cooling roll 104 and the gas-impermeable base layer 108. The resin is fed through a nozzle 112 of the extruder 110. The temperature of the melt-extruded resin is dependent on the type of resin used, and can typically range from about 200° C. to about 250° C. The amount of resin extruded into the laminating unit 100 is dependent on the desired thickness of the heat-sealable inner layer 106.

A pattern fabricated on the circumferential surface of the cooling roll 104 in accordance with one embodiment of the present invention can include cavities (and/or protuberances) defining a plurality of discrete channels having a baffled structure. The resin extruded from the nozzle 112 is pressed between the cooling roll 104 and the gas-impermeable base layer 108 and flows into the cavities of the cooling roll 104. The resin quickly cools and solidifies in the desired pattern while adhering to the gas-impermeable base layer 108, thereby forming the heat-sealable inner layer 106 of the panel. The heat-sealable inner layer 106 can be formed while the resin is sufficiently heated to allow the resin to flow, thereby molding the resin, unlike other methods adopting a post-embossing treatment where the heat-sealable inner layer is drawn by a die or embossed between male and female components.

Figure 2A:
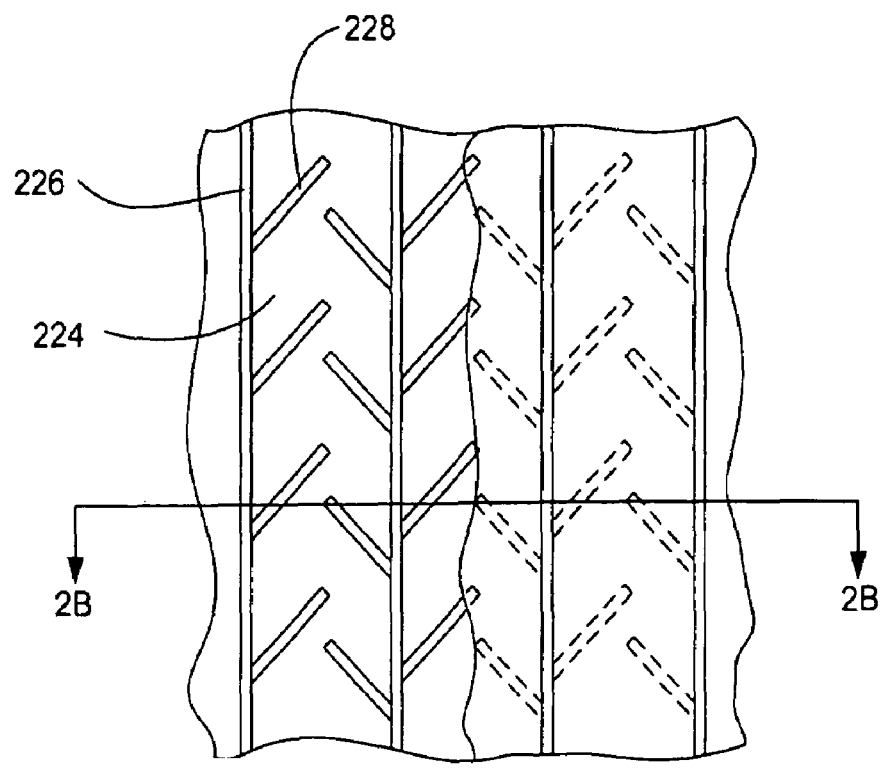
FIG. 2A is a top view of a partial portion of a first panel overlapping a partial portion of a second panel in accordance with one embodiment of the present invention.
Figure 2B:
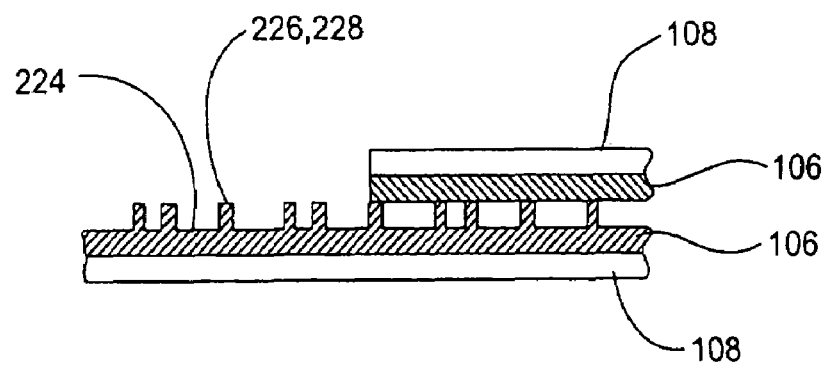
FIG. 2B is a cross-section view through line 2B-2B of FIG. 2A.

The thickness of each protuberance formed on the heat-sealable inner layer 106 of a panel can be determined by the depth of the cavities of the cooling roll 104, and the width of the channel can be determined by the interval between the cavities. Thus, the shape, width, and thickness of the channels for the evacuation of air and/or other gases can be controlled by changing the specifications for the cavities of the cooling roll 104. FIGS. 2A and 2B illustrate a cross-section (along line 2B-2B) of two panels in accordance with one embodiment of the present invention (the thickness of the panels are exaggerated relative to the width of the channel walls and baffles). The heat-sealable inner layer 106 can range from preferably 0.5-6.0 mils in thickness at the channels 224, and preferably 1.0-12.0 mils in thickness at the protuberances 226,228, while the gas-impermeable base layer 108 can range from about preferably 0.5-8.0 mils in thickness. The dimensions of the inner layer and the base layer are set forth to illustrate, but are not to be construed to limit the dimensions of the inner layer and the base layer.

Figure 3A:
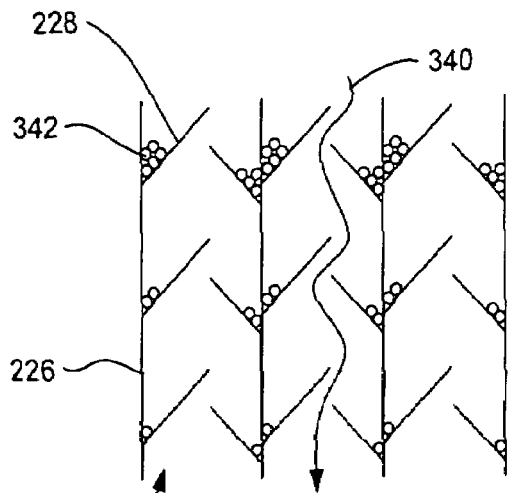
FIG. 3A-3E are plan views of exemplary patterns on a panel in accordance with embodiments of the present invention, manufactured by the process shown in FIG. 1.

FIG. 3A is a plan view of a pattern 320 formed on a panel by the cooling roll 104 for use in a vacuum bag, in which the heat-sealable inner layer 106 is molded in such a way that protuberances form the plurality of channels 224 having channels walls 226 and baffles 228. The baffles 228 can be arranged in a herringbone pattern at angles such that air and/or other gases 340 (shown schematically) can be drawn around the baffles 228 by suction and evacuated from the vacuum bag, while heavier liquid particles 342 can be trapped between the channel walls 226 and the baffles 228. Angles formed by the intersection of baffles 228 and channel walls 226, and gaps between adjacent baffles 228 can be defined when producing the cooling roll 104 to suit the liquid intended to be trapped. Different arrangements of the baffles 228 relative to the chamber walls 226, and relative to other baffles 228 can be multi-fold (shaped to define liquid-trapping vessels), and can be optimized to improve evacuation of the air and/or other gases 340, while effectively preventing liquids 342 from being drawn out of the vacuum bag. For example, as shown in FIG. 3A the baffles 228 can be arranged such that an approach angle for passing through the channel opening between the baffles 228 is severe and that vessels formed by the baffles 228 are relatively deep, thereby retarding liquid flow by deflecting liquid 342 into the vessels and trapping a significant amount of liquid 342.

Figure 3B:
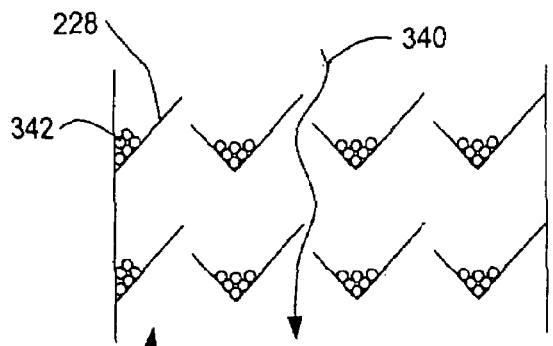

As indicated above, one of ordinary skill in the art can appreciate the multitude of different baffle arrangements for retarding the evacuation of liquid 342 relative to the evacuation of air and/or other gases 340. As shown in FIG. 3B, in other embodiments a pattern 320 fabricated on the circumferential surface of the cooling roll 104, and thereafter the panel, can mold protuberances forming a plurality of channels 224 defined by "V"-shaped baffles 228, eliminating the need for molding channel walls. In still other embodiments, the channel walls 226 can extend substantially the length of the panel with only a portion of the length of the channels near an evacuation opening having baffles 228.

Figure 3C:
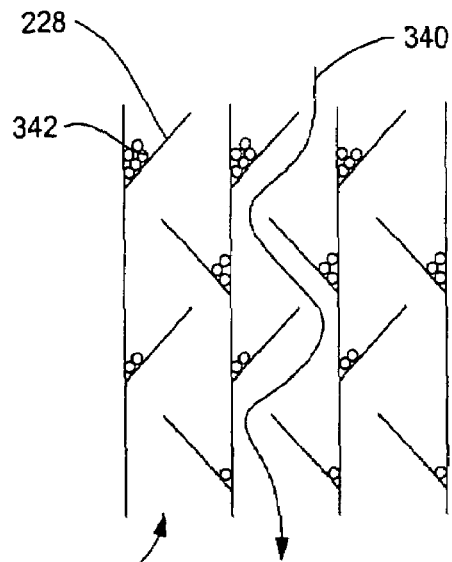
Figure 3D:
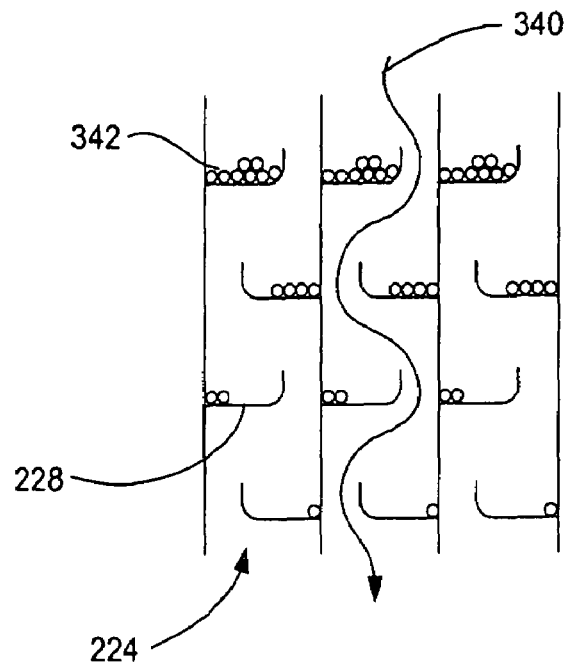

As shown in FIG. 3C, in other embodiments a pattern 320 fabricated on the circumferential surface of the cooling roll 104, and thereafter the panel, can mold protuberances forming a plurality of channels 224 having channels walls 226 and baffles 228, wherein each baffle 228 extends across a substantial portion of the width of the channel 224, thereby defining a path between the baffle 228 and the channel wall 226 for the air and/or other gases 340 to be drawn. The baffles 228 can alternatively be parabolic or rounded, as shown in FIG. 3D, to form pockets for collecting liquid particles 342.

Figure 3E:
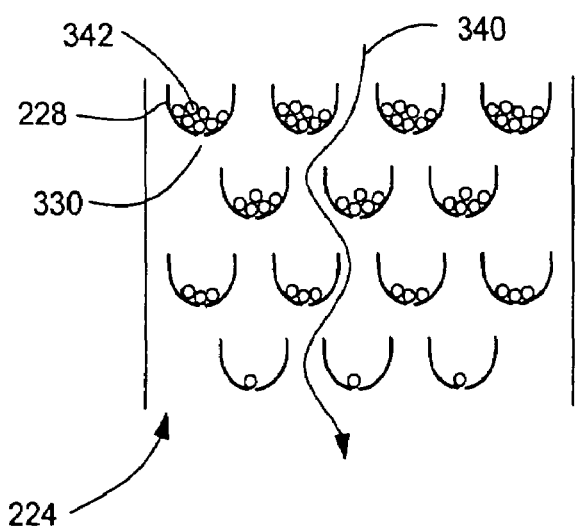

FIG. 3E illustrates still another embodiment of a pattern 320 fabricated on the circumferential surface of the cooling roll 104, and thereafter the panel, that can include parabolically-shaped or "U"-shaped baffles 228 arranged like fish-scales either along the length of the panel, or a portion of the panel to capture liquid particles 342. The U-shaped baffles 228 can also include slits 330 in the troughs of the U-shaped baffles 228 small enough to improve the flow of air and/or other gases 340 while retarding an amount of liquid particles 342. In other embodiments, the baffles 228 can be more or less parabolic. One of ordinary skill in the art can appreciate the multitude of different baffle shapes for retarding the evacuation of liquid relative to the evacuation of air or other gases.

It is understood that the trapping of liquid in baffles or vessels formed in the bag is advantageous as this structure retards and prevents liquids from being drawn into the vacuum pump or suction device of a vacuum sealing tool such as disclosed in U.S. Pat. No. 4,941,310, which is incorporated herein by reference.

Figure 4:
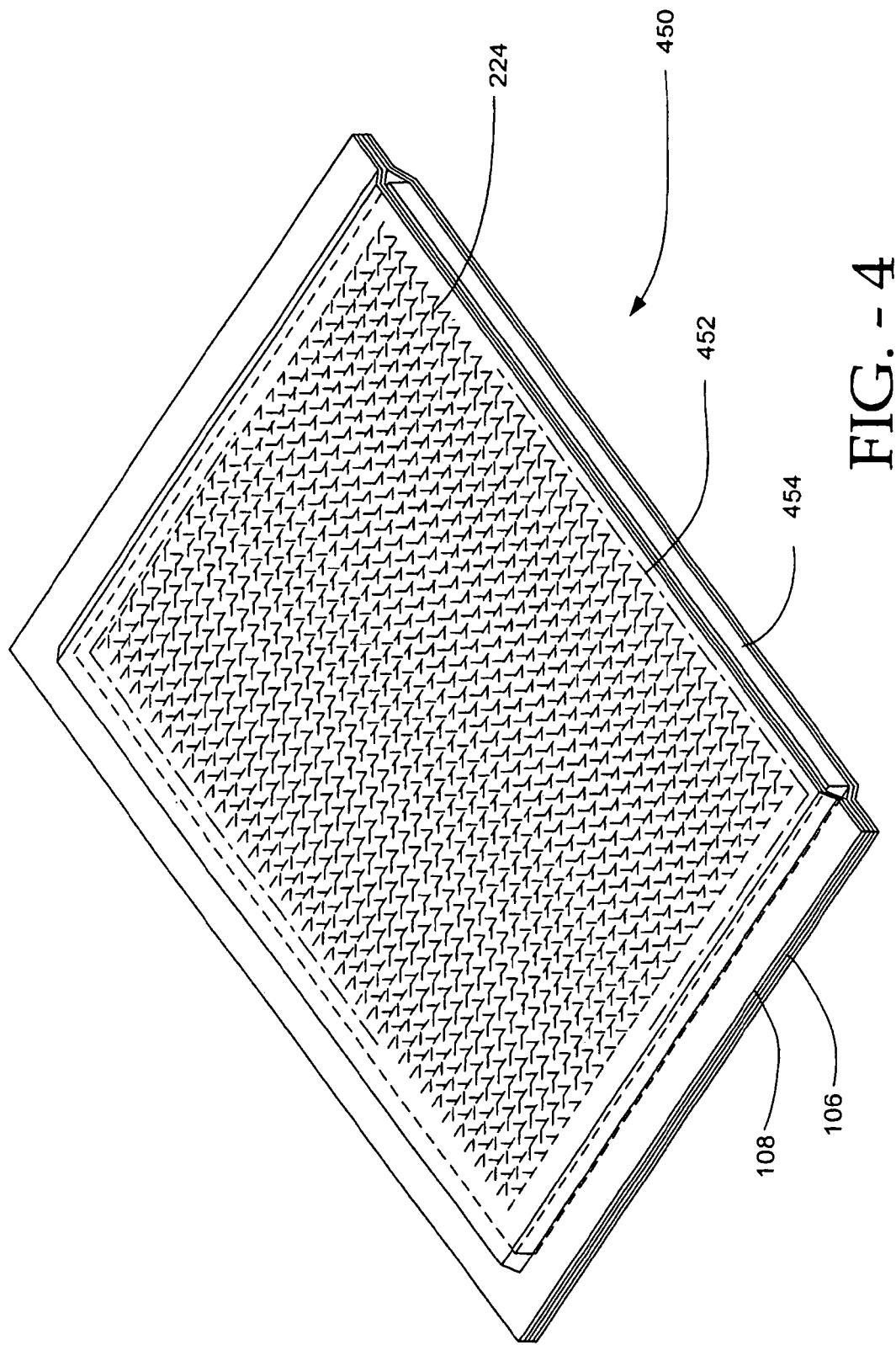
FIG. 4 is a perspective view of a vacuum bag in accordance with one embodiment of the present invention.

FIG. 4 illustrates a bag for use in vacuum packaging in accordance with one embodiment of the present invention. The vacuum bag 450 comprises a first panel 452 and a second panel 454 overlapping each other. Channels 224 are formed on at least one of the panels 452,454 in accordance with an embodiment described above. The heat-sealable inner layer 106 and the gas-impermeable base layer 108 of the first and second panels 452,454 are typically made of the same material respectively, but can alternatively be made of different materials that exhibit heat-sealability and gas-impermeability respectively. As described above, the resin-formed layer 106 is used as an inner layer and the gas-impermeable base layer 108 is used as an outer layer. The lower, left, and right edges of the first and the second panel 452,454 are bonded to each other by heating, so as to form an envelope for receiving a perishable or other product to be vacuum packaged. Once a perishable or other product is placed in the vacuum bag 450, air and/or other gases can be evacuated from the bag 450, for example by a vacuum sealing machine as described in the above referenced U.S. Pat. No. 4,941,310, which is incorporated herein by reference. Once the air and/or other gases are evacuated to the satisfaction of the user, the inlet can be sealed by applying heat, thereby activating the heat-sealable inner layers 106 and bonding them together where contacted by the heat.

The foregoing description of preferred embodiments of the present invention has been provided for the purposes of illustration and description. It is not intended to be exhaustive or to limit the invention to the precise forms disclosed. It is to be understood that many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

The invention claimed is:

1. A method of manufacturing a bag adapted to receive an article, comprising:
   rotating a first roller having a plurality of recesses;
   rotating a second roller adjacent to the first roller, said second roller can feed a first film adjacent to the first roller;
   applying a molten material between the first roller and the film; said molten material filling the recesses of the first roller, and
   said molten material and film moving between the first roller and the second roller forming a first panel with a plurality of protuberances defining a plurality of baffles and a plurality of channels, each of the plurality of baffles forming a vessel configured for trapping liquid therein and the plurality of channels defining a plurality of non-linear channel paths between the baffles, the non-linear channel paths having an approach angle to the baffles to deflect liquid into the vessels
   forming a second panel; and
   mating the first panel to the second panel in order to form a bag.

2. The method of claim 1 including: using a gas impermeable material for the film; and using a heat sealable material for the molten material.

3. The method of claim 1, wherein said first roller includes a peripheral surface having a first portion including the plurality of recesses for defining a plurality of protuberances and a second portion without a plurality of recesses.

4. The method of claim 1 including forming the protuberances in part with walls that run parallel to the length of the film and in part with walls that run across the length of the firm.

5. The method of claim 1 including forming the protuberances from the plurality of recesses with some of the plurality of recesses running parallel to the length of the film and some of the plurality of recesses running across the length of the firm.

6. The method of claim 1 including forming the protuberances from the plurality of recesses with some of the plurality of recesses running in about the direction of rotation of a peripheral surface of the first roller and some of the recesses running in about a direction across the direction of rotation of the peripheral surface.

7. The method of claim 1, wherein forming the plurality of protuberances define U shaped baffles.

8. The method of claim 1, wherein gas flows through the non-linear channel paths between the baffles.

9. The method of claim 1, wherein forming the plurality of baffles forms V shaped vessels.

10. The method of claim 1, wherein forming the plurality of baffles forms L shaped vessels.

11. A method for manufacturing a bag adapted to receive an article, comprising:
    feeding a first gas-impermeable film to a first nip between a first cooling roll and a first laminating roll, the first cooling roll having a plurality of cavities for forming a structure;
    extruding molten resin to the first nip;
    pressing the molten resin between the first cooling roll and the first gas-impermeable film such that the molten resin fills the plurality of cavities exposed to the first nip;
    cooling the resin such that the resin forms the structure and adheres to the gas impermeable film, forming a first panel;
    wherein the structure comprises a plurality of protuberances defining a plurality of baffles and a plurality of channels, each of the plurality of baffles forming a vessel configured for trapping liquid therein and the plurality of channels defining a plurality of non-linear channel paths between the baffles, the non-linear channel paths having an approach angle to the baffles to deflect liquid into the vessels;
    feeding a second gas-impermeable film to a second nip between a second cooling roll and a second laminating roll;
    extruding molten resin to the second nip;
    pressing the molten resin between the second cooling roll and the second gas-impermeable film;
    cooling the molten resin such that a second inner layer is formed;
    wherein the second inner layer adheres to the second gas-impermeable film, thereby forming a second panel;
    overlapping the first panel with the second panel; and
    applying heat to a first, second, and third side of the first and second panels such that the first panel and the second panel form an envelope.

12. A method for manufacturing a bag adapted to receive an article, comprising:
    rotating a first cooling roll at a first rate, the first cooling roll including one or both of a plurality of cavities and a plurality of protuberances for forming a structure having a plurality of channels defined at least partially by a plurality of baffles, each of the plurality of baffles forming a vessel configured for trapping liquid therein and the plurality of channels defining a plurality of non-linear channel paths between the baffles, the non-linear channel paths having an approach angle to the baffles to deflect liquid into the vessels;
    rotating a first laminating roll at a second rate;
    introducing a first gas-impermeable film having at least one layer to a first nip between the first cooling roll and the first laminating roll;
    extruding molten resin to the first nip;
    pressing the molten resin between the first cooling roll and the first gas-impermeable film such that the molten resin fills the plurality of cavities exposed to the first nip;
    cooling the molten resin such that a first inner layer is formed;
    wherein the first inner layer comprises the structure;
    wherein the first inner layer adheres to the first gas-impermeable film, thereby forming a first panel;
    rotating a second cooling roll at a third rate;
    rotating a second laminating roll at a fourth rate;
    introducing a second gas-impermeable film having at least one layer to a second nip between the second cooling roll and the second laminating roll;

extruding molten resin to the second nip;
pressing the molten resin between the second cooling roll and the second gas-impermeable film;
cooling the molten resin such that a second inner layer is formed;
wherein the second inner layer adheres to the second gas-impermeable film, thereby forming a second panel;
overlapping the first panel with the second panel; and
applying heat to a portion of a periphery the first and second panels such that the first panel and the second panel form an envelope.

13. The method of claim 12, wherein the second rate is an integer multiple of the first rate and the fourth rate is an integer multiple of the third rate.

14. The method of claim 12, wherein the first gas-impermeable film and the second gas-impermeable film comprise at least one layer.

15. The method of claim 14, wherein the at least one layer is one of polyester, polyamide, ethylene vinyl alcohol, and nylon.

16. The method of claim 12, wherein the molten resin is polyethylene.

17. The method of claim 12, wherein a thickness of the first inner layer is determined by the size of the first nip and the thickness of the second inner layer is determined by the size of the second nip.

* * * * *